Sept. 10, 1968   HANS-JOACHIM CONRAD ET AL   3,400,940
SEALING CONSTRUCTION WITH TILTABLE SEALING STRIP
Filed April 12, 1965                      2 Sheets-Sheet 1
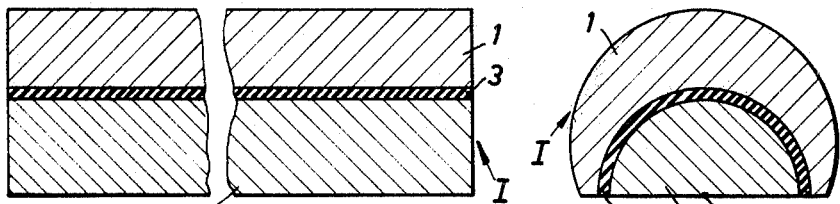
Fig.1   Fig.2
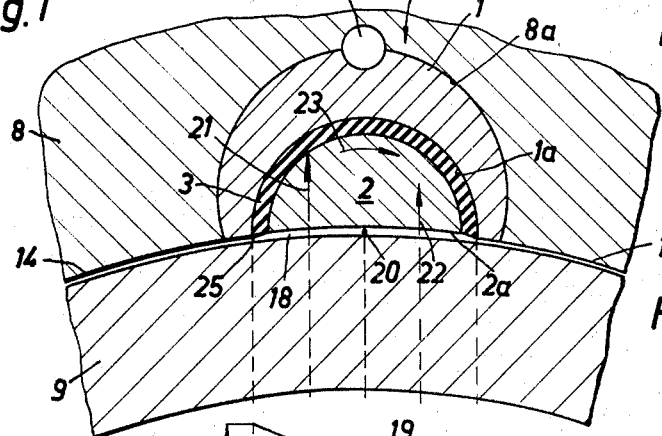
Fig.3
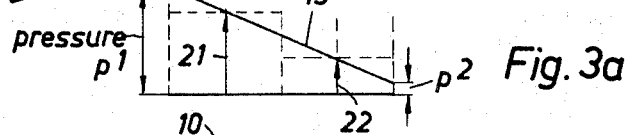
Fig.3a
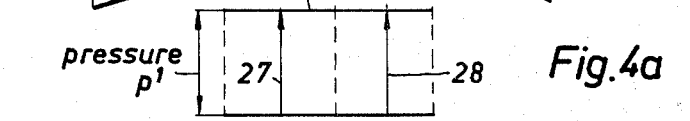
Fig.4
Fig.4a
Inventors:
Hans-Joachim Conrad
Werner Schröder
By Walter Becky Sept. 10, 1968    HANS-JOACHIM CONRAD ET AL    3,400,940
SEALING CONSTRUCTION WITH TILTABLE SEALING STRIP
Filed April 12, 1965    2 Sheets-Sheet 2

Inventors:
Hans-Joachim Conrad
Werner Schröder
By Austin Busky

United States Patent Office 3,400,940
Patented Sept. 10, 1968

3,400,940
SEALING CONSTRUCTION WITH
TILTABLE SEALING STRIP
Hans-Joachim Conrad, Essen-Bredeney, and Werner
Schröder, Essen, Germany, assignors to Beteiligungs-
und Patentverwaltungsgesellschaft mit beschrankter
Haftung, Essen, Germany
Filed Apr. 12, 1965, Ser. No. 447,391
Claims priority, application Germany, Apr. 16, 1964,
B 76,357
2 Claims. (Cl. 277—94)

ABSTRACT OF THE DISCLOSURE

The present invention concerns a sealing structure with tiltable sealing strip between two members movable relative to each other and defining therebetween a gap. The tiltable sealing strip tiltably journalled in one of said members defines in its intermediate position an intermediate gap with the other member, said intermediate gap dividing said first mentioned gap into two gap sections. When a pressure drop occurs between said two gap sections, a torque is exerted upon said sealing strip so that the latter tilts in one or the other direction to thereby seal said intermediate gap relative to one or the other gap section.

---

The present invention relates to a sealing arrangement, especially for sealing two members relative to each other which rotate or slide with regard to each other. With sealing problems of this character, it has heretofore been customary to employ sealing strips or piston rings the back side of which is subjected to the pressure of the medium against which the seal has to be effected, thereby pressing the respective sealing members against the surface to be sealed. Such an arrangement, however, is disadvantageous, especially when high pressures as for instance 200 kilograms per square centimeter are involved. This is due to the considerable and rapid wear of the elements involved and also due to considerable friction losses.

It is, therefore, an object of the present invention to provide a sealing arrangement which will overcome the above mentioned drawbacks.

It is also an object of this invention to provide a sealing arrangement, especially for use in connection with two elements movable relative to each other, which will result in an effective seal although, even at high pressure differences on both sides of the seal, the sealing element will be pressed only slightly against the respective surface to be sealed.

It is another object of this invention to provide a sealing arrangement as set forth above, which will not cause any undue wear and friction losses.

It is still another object of this invention to provide a sealing arrangement which will yield an effective seal without the necessity that the sealing element engages the respective element to be sealed.

It is also an object of this invention to provide a sealing arrangement as set forth above which will make it possible to keep the sealing gap to a minimum.

Still another object of this invention consists in the provision of a sealing arrangement which will be equally well effective in both directions.

These and other objects and advantages of the invention will appear more clearly from the following specification in connection with the accompanying drawings, in which:

FIG. 1 is a longitudinal section through a sealing means according to the present invention.

FIG. 2 is a cross section of the sealing means shown in FIG. 1.

FIG. 3 represents a cross section through a sealing arrangement with the sealing means of FIGS. 1 and 2 for sealing two elements relative to each other which are moving in opposite direction with regard to each other, said sealing arrangement being shown in open condition.

FIG. 3a represents a pressure diagram pertaining to the arrangement of FIG. 3.

FIG. 4 shows the sealing arrangement of FIG. 3 in closed condition.

FIG. 4a is a pressure diagram pertaining to FIG. 4.

Figure 7:
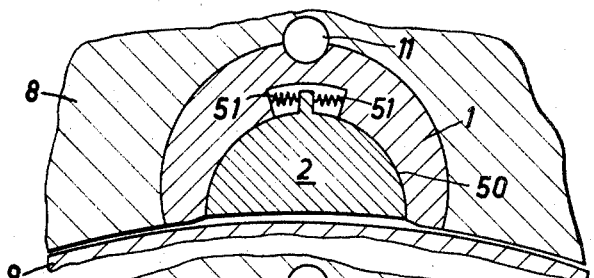
FIG. 7 is a cross section through a modified sealing arrangement according to the invention in opened condition.

A sealing arrangement according to the present invention while not limited to, is particularly advantageous in connection with two structural elements defining the gap to be sealed and moving relative to each other so that a change in the width of the gap is unavoidable. In other words, the two structural elements in addition to moving relative to each other in opposite directions also carry out movements which vary the gap therebetween.

The present invention is based on an arrangement in which between the two structural elements moving with regard to each other there is provided in the recess of one of said structural elements a sealing means which being subjected to the pressure against which the seal is to be effected will cause said sealing means automatically to move into a sealing position. More specifically, the arrangement according to the present invention is characterized in that a sealing strip is rotatably journalled in a recess of one of said structural elements in such a way as to be able to rotate about an axis located in the longitudinal direction of said sealing strip, said sealing strip or the element carrying the same forming a narrow gap with the other structural element in which at the starting position of the sealing strip a pressure drop prevails which exerts a torque upon the sealing strip. Said pressure drop corresponds to the difference between the pressures in the chambers to be sealed against each other, while the pressure medium is prevented from flowing along that surface of said sealing strip which is facing away from the gap to be sealed.

According to a further development of the present invention, the seal may be so designed that after it has moved into its closing position it will remain in this position.

Referring now to the drawings in detail and FIGS. 1 to 4 thereof in particular,, the sealing member according to the present invention represents an insert generally designated I which is composed of a crescent-shaped member 1 inserted into a corresponding bore 8a of a housing 8. Member 1 is secured against rotation in bore 8a by a set pin 11. Arranged within said crescent-shaped member 1 is a sealing strip 2 in such a way that it can turn slightly toward the right or toward the left. This sealing strip or sealing ledge 2 has the shape of a semi-cylinder with a flat side 2a so that the cylinder axis 20 is substantially located on said flat side. Inasmuch as the gap in which sealing strip 2 is rotatably journalled in the cylindrical trough-shaped surface 1a of member 1 has to be leak-proof, the said gap is filled with rubber 3 which is vulcanized to body 1 as well as to strip 2. It is, of course, to be understood that instead of effecting the seal by rubber, other customary sealing means may be employed.

The function of the sealing arrangement according to the present invention will be more clearly understood with regard to FIG. 3 showing the sealing arrangement in open position, in other words, not yet in action. It may be assumed that the inner member 9 is rotating while the outer member or housing 8 is stationary and has the sealing arrangement 1 inserted thereto. It is furthermore assumed that two chambers of different pressures are to be sealed with regard to each other. More specifically, it may be assumed that in gap 14 there prevails a pressure $p_1$ of for instance 200 atmospheres. This pressure $p_1$ is also shown in the diagram of FIG. 3a. It is furthermore assumed that in gap 16 there prevails a pressure $p_2$ of, for instance, 20 atmospheres, said pressure $p_2$ also being shown in the diagram of FIG. 3a. Due to the pressure difference prevailing in gaps 14 and 16, it will be evident that below the seal I in chamber 18 there will occur a pressure drop from 200 atmospheres to 20 atmospheres. The course of this pressure drop may be of various characters. For purposes of simplicity, it is assumed that the course of said pressure drop is linear as indicated in diagram 3a by line 19. As previously mentioned, sealing strip 2 is rotatable about its axis 20.

Assuming that along sealing strip 2 through the central axis 20 and perpendicular to the drawing plane there is provided a vertical plane, it will be evident from diagram 3a that the intermediate pressure acting upon the left-hand side of said plane will be higher than the medium pressure acting upon the right-hand side of said plane. The components of these two different medium pressures are indicated in the diagram of FIG. 3a by the arrows 21 and 22. These two forces when transferred to FIG. 3 as shown in the drawing produce a torque turning in clockwise direction as indicated by the arrow 23. This torque thus turns sealing strip 2 in clockwise direction so that the latter will turn within the crescent-shaped member 1 into FIG. 4 position in which the right-hand edge of member 2 engages and thus seals against rotary member 9. This turning movement is possible in view of the elasticity of the rubber layer 3 between stationary member 1 and sealing strip 2.

As will be seen from FIGS. 4 and 4a, in gap 14 there will now prevail the pressure $p_1$ as before. This pressure, however, now also prevails in gap 18a which has now a wedge-shaped cross section. This is due to the fact that the right-hand edge (with regard to FIG. 4) of sealing strip 2 seals with regard to gap 16. In other words, the same pressure $p_1$ now prevails over the entire length of gap 18a as is illustrated by the horizontal line 26 in the diagram of 4a. Thus, at both sides of axis 20 forces 27 and 28 of the same magnitude will prevail which will balance each other inasmuch as they have the same distance from axis 20. It is merely the rubber layer 3 deformed by the closing movement which will exert a return thrust upon sealing strip 2. This return thrust, which in the embodiment shown in FIG. 4 exerts a torque directed in counter clockwise direction upon sealing strip 2, is symbolized by the arrow 29. Consequently, the sealing strip 2 will again open somewhat. However, at the very instant in which said sealing strip opens, a pressure drop will occur in gap 18 as illustrated in FIG. 3, and this pressure drop will impart upon the sealing strip 2 the tendency to close again. As a result, a balanced intermediate position will be adopted by sealing strip 2 or if insufficient attenuation should prevail, the sealing strip will carry out an oscillating movement with a high or low frequency. At any rate, it will be assured that gap 18 will be sealed approximately tightly even though not quite completely. A minor leakage can be put up with primarily if it is desired that edge 24 of sealing strip 2 will not be subjected to too great a wear.

With the embodiment of FIGS. 3 and 4 it was assumed that the pressure at the left-hand side in gap 14 is higher than on the right-hand side in gap 16. However, it may also be possible that the pressure in gap 16 is higher than that in gap 14. Inasmuch as the sealing arrangement in FIGS. 3 and 4 is symmetrically designed, the operation of the sealing strip will be analogous to that described above, the mere difference being in that sealing strip 2 instead of being tilted clockwise will be tilted counter clockwise.

With pulsating pressures in gaps 14 and 16 with which the pressure peaks at both sides will not be reached simultaneously but will have a phase displacement, the sealing strip 12 will in conformity with the direction of flow occurring in gap 18 carry out its closing movement toward the right or toward the left.

Figure 5:
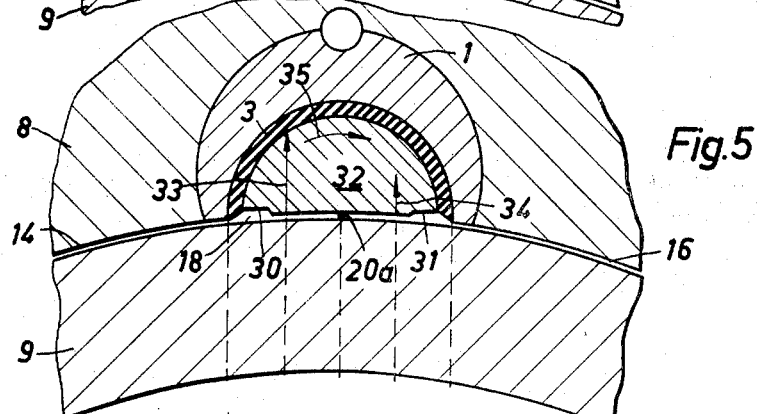
FIG. 5 is a cross section through a modified sealing arrangement in open condition.
Figure 6:
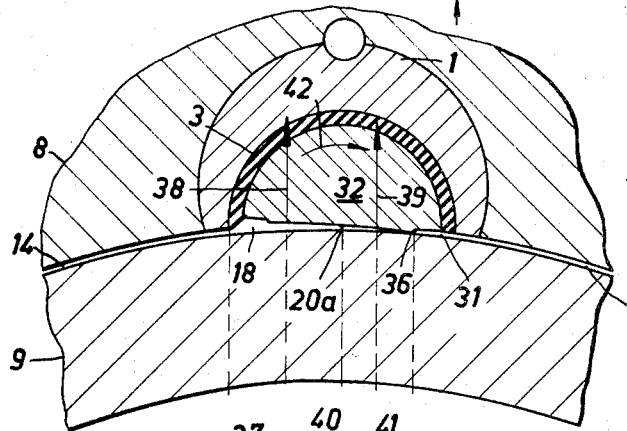
FIG. 6 illustrates the sealing arrangment of FIG. 5 in closed condition.

Whereas the sealing arrangement according to FIGS. 3 and 4 represents an instable design which while reducing the width of gap 18 does not fully close said gap, FIGS. 5 and 6 illustrate an embodiment of the present invention in which the sealing strip when closing once will remain closed.

More specifically, sealing strip 32 differs from sealing strip 2 according to FIGS. 3 and 4 merely in that the flat side of said sealing strip is provided with groove means 30, 31 respectively located on opposite sides of the axis 20a of sealing strip 32.

Figure 5A:
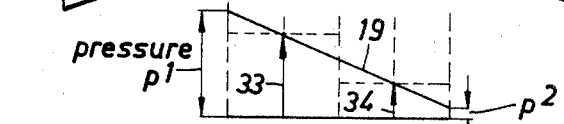
FIG. 5a is a pressure diagram pertaining to FIG. 5.
Figure 6A:
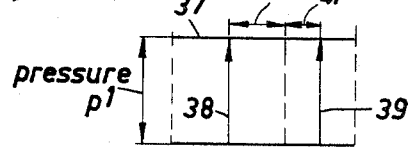
FIG. 6a is a pressure diagram pertaining to FIG. 6.

With regard to the operation of the arrangement of FIGS. 5 and 6, it may again be assumed that in gap 14 there prevails a pressure $p_1$ of, for instance, 200 atmospheres whereas in gap 16 there prevails a pressure $p_2$ of 20 atmospheres. As has been illustrated in the diagram of FIG. 5a, a pressure drop indicated by line 19 will occur in gap 18. Assuming that a plane vertical to the drawing plane is passed through axis 20a of sealing strip 32, it will be appreciated that a force 33 acts upon the left-hand side of sealing strip 32 whereas a force 34 will act upon the right-hand side of sealing strip 32. Consequently, a torque in clockwise direction indicated by the arrow 35 will be exerted upon sealing strip 32 so that the latter tilts into FIG. 6 position. As will be seen from FIG. 6, sealing strip 32 now has its edge 36 in engagement with the rotating member 9 whereby gap 18 is closed. As a result thereof, the same pressure $p_1$ which prevails in gap 14 will then build up along the entire gap 18 from the left-hand side thereof to edge 36. This is illustrated in the diagram of FIG. 6a by the horizontal line 37. Consequently, the strip section extending from the left-hand edge of groove 30 to edge 36 is subjected to a greater pressure than the strip section from edge 36 to the right-hand end of groove 31. In other words, while force 38 imparts upon sealing strip 32 a torque in clockwise direction with the lever arm 40, force 39 imparts upon strip 32 a smaller torque in counter clockwise direction inasmuch as its lever arm 41 is shorter than lever arm 40. Consequently, there remains a torque indicated by the arrow 42 which acts in closing direction and keeps sealing strip 32 in closed position.

Also this sealing arrangement is effective in either direction inasmuch as the return thrust of rubber layer 13 will when equal pressure prevails in gaps 14 and 16 first return the strip 32 to its neutral or ineffective position, and only when a pressure drop occurs, will strip 32 be tilted in the corresponding direction.

The invention is applicable for numerous purposes, for instance for sealing sliding members which in rotary displacement devices, preferably in the housings thereof, are displaceable in radial or axial direction and subdivide the space between the rotating displacement member and the housing into pressure chambers.

Summarizing the present invention, it will be evident from the above that the sealing strip proper is journalled in a machine element for instance in a housing so as to be turnable about the longitudinal axis of said sealing strip. The sealing strip is interposed between the two structural elements which move relative to each other and are to be sealed relative to each other while said sealing strip forms a gap with the movable element. When in the spaces or gaps to be sealed with regard to each other a pressure difference prevails, a flow will occur in said gap before the seal becomes effective, in other words, in the direction of flow, a pressure drop will occur which results in a torque exerted upon the sealing strip in closing direction of said sealing strip.

As soon as the sealing strip has moved into or approximately into its closing position, the flow in said gap stops and the pressure drop disappears. Immediately the same pressure builds up in the gap which prevails in the space of higher pressure. As a result thereof, the torque exerted upon the sealing strip in closing direction disappears and the sealing strip opens slightly. Thus, the sealing strip will assume a balanced position while leaving a slight gap. Inasmuch as the function of the sealing strip were disturbed if in its bearing also a flow with pressure drop would occur, the turnable sealing strip is vulcanized by rubber or other similar material to the housing. This intermediate elastic layer is preferably so selected that the sealing strip will be permitted to turn sufficiently to permit one of its side edges to effect the desired seal.

While the just described arrangement of FIGS. 2 and 3 leaves a slight gap, the arrangement of FIGS. 5 and 6 is such that once the sealing strip closes, it will stay closed in view of the recess means 30, 31 as set forth above.

It is, of course, to be understood that the present invention is, by no means, limited to the particular arrangements shown in the drawings but also comprises any modifications within the scope of the appended claims. Thus, while according to the embodiments shown in FIGS. 3 to 6 a rubber layer 3 is vulcanized to the sealing strip on one hand and the insert member 1 on the other hand, also other elastic material may be employed for this purpose instead of said rubber layer 3. It is furthermore possible to do without the sealing strip 3 as shown in FIGURE 7 by journalling the sealing strip in an ordinary metallic slide fit 50. The return thrust may then be provided by other means as for instance springs 51.

What we claim is:

1. In combination: first means having a substantially semi-cylindrical trough-shaped recess therein, second means arranged adjacent to and defining with said first means a gap to be sealed, said first and second means being movable relative to each other, a sealing member in the shape of a semi-cylindrical member, the outer cylindrical surface of said sealing member having a shorter radius than the cylindrical surface of the trough-shaped recess, and elastic sealing material filling the space between said outer cylindrical surface of said sealing member and the surface faced thereby of said trough-shaped recess, said elastic material being firmly bonded to both said trough-shaped surface and said outer cylindrical surface of said sealing member, said sealing member having a flattened surface extending in the longitudinal direction of said sealing member and together with the adjacent portion of said second means defining an intermediate gap forming the continuation of said first mentioned gap and dividing said first mentioned gap into two gap sections; the difference of the pressures in said gap sections which are adjacent to and on opposite sides of said sealing member being adapted to bring about a flow of fluid through said intermediate gap; a pressure drop resulting from said flow exerting a torque upon said sealing member to rotate said sealing member and thus to move one of two sealing edges of said sealing member toward said second member until said gap sections are at least partially sealed by said sealing member relative to each other.

2. An arrangement according to claim 1, in which the flattened surface of said sealing member is provided with two recess means extending in the longitudinal direction of said sealing member and from the periphery thereof in a direction toward each other while having their inner edges spaced from each other thus forming two sealing edges remote from said periphery.

References Cited

UNITED STATES PATENTS

| | | | |
|---|---|---|---|
| 2,492,869 | 12/1949 | Johnson | 103—124 |
| 2,873,683 | 2/1959 | Sherwood | 103—84 |
| 2,969,020 | 1/1961 | Fazekas | 103—123 X |
| 3,231,287 | 1/1966 | Stuempeig | 277—94 |

LAVERNE D. GEIGER, *Primary Examiner.*

J. S. MEDNICK, *Assistant Examiner.*